United States Patent
Yu et al.

(10) Patent No.: US 12,554,720 B2
(45) Date of Patent: Feb. 17, 2026

(54) PREDICATE TRANSFER PRE-FILTERING ON MULTI-JOIN QUERIES

(71) Applicant: Wisconsin Alumni Research Foundation, Madison, WI (US)

(72) Inventors: Xiangyao Yu, Madison, WI (US); Paraschos Koutris, Madison, CT (US)

(73) Assignee: WISCONSIN ALUMNI RESEARCH FOUNDATION, Madison, WI (US)

( * ) Notice: Subject to any disclaimer, the term of this patent is extended or adjusted under 35 U.S.C. 154(b) by 0 days.

(21) Appl. No.: 18/537,081

(22) Filed: Dec. 12, 2023

(65) Prior Publication Data

US 2025/0181584 A1 Jun. 5, 2025

(51) Int. Cl.
*G06F 16/248* (2019.01)
*G06F 16/2453* (2019.01)
*G06F 16/2455* (2019.01)

(52) U.S. Cl.
CPC .... *G06F 16/2456* (2019.01); *G06F 16/24544* (2019.01); *G06F 16/248* (2019.01)

(58) Field of Classification Search
None
See application file for complete search history.

(56) References Cited

U.S. PATENT DOCUMENTS

| | | | |
|---|---|---|---|
| 9,336,275 B2 | 5/2016 | Potapov et al. | |
| 9,367,574 B2 | 6/2016 | Gupta | |
| 10,515,106 B1 | 12/2019 | Halstead et al. | |
| 10,642,840 B1 | 5/2020 | Attaluri et al. | |
| 11,423,036 B2 | 8/2022 | Halstead et al. | |
| 2014/0067789 A1* | 3/2014 | Ahmed | G06F 16/24544 707/E17.017 |
| 2015/0324426 A1* | 11/2015 | Goyal | G06F 16/00 707/714 |
| 2021/0319023 A1* | 10/2021 | Ding | G06F 16/24544 |
| 2022/0164353 A1* | 5/2022 | Pasupuleti | G06F 16/24544 |
| 2023/0169056 A1 | 6/2023 | Halstead et al. | |

OTHER PUBLICATIONS

"Predicate Transfer: Efficient Pre-Filtering on Multi-Join Queries", Yang et al., all pages, https://arxiv.org/pdf/2307.15255 (Year: 2023).*
Apache Arrow, https://arrow.apache.org, 2016, 2 pages.
Apache Calcite, https://calcite.apache.org/, 2014, 4 pages.
Apache Parquet, https://parquet.apache.org/ ,2016, 2 pages.
Best Practices for Optimizing Your DBT and Snowflake Development, 2021, 30 pages.
Bloom, "Space/Time Trade-offs in Hash Coding with Allowable Errors", Commun. ACM 13, 7, 1970, 5 pages.

(Continued)

*Primary Examiner* — Son T Hoang
(74) *Attorney, Agent, or Firm* — CANTOR COLBURN LLP

(57) ABSTRACT

A method includes receiving a query of a database including a plurality of tables, constructing a join graph, and constructing a local predicate including a local filter. The method also includes transferring the local predicate across the join graph, applying the local filter and one or more transferred filters to the tables of the join graph, performing join operations on the filtered tables of the join graph, and returning a result of the query based on joining the filtered tables.

20 Claims, 5 Drawing Sheets

(56) References Cited

OTHER PUBLICATIONS

Chainani et al., "Improved speed and scalability in Amazon Redshift", AWS Big Data Blog, 2020, 8 pages.
Gekk et al., "Introducing Apache Spark 3.3 for Databricks Runtime 11.0", Databricks, Jun. 15, 2022, 10 pages.
Joglekar et al., "AJAR: Aggregations and Joins over Annotated Relations", In Proceedings of the 35th ACM SIGMOD-SIGACT-SIGai Symposium on Principles of Database Systems, 2016, 16 pages.
Maria Colgan, "Getting started with Oracle Database In-Memory Part IV—Joins In The IM Column Store" Jan. 2, 2019, 8 pages.
Sukriti et al., "Optimizing Distributed Joins with Bloom Filters", In Distributed Computing and Internet Technology: 5th International Conference, ICDCIT, Dec. 2008, 12 pages.
TPC-H_v3.0.1, https://www.tpc.org/TPC_Documents_Current_Versions/pdf/TPC-H_v3.0.1.pdf, Apr. 2022, 138 pages.
Yang et al., "FlexPushdownDB: Hybrid Pushdown and Caching in a Cloud Dbms", VLDB 14, 11, 2021, 13 pages.
Yang et al.,"Predicate Transfer: Efficient Pre-Filtering on Multi-Join Queries", arXiv:2307.15255 [cs.DB, Jul. 28, 2023; 6 pages.
Yannakakis, "Algorithms For Acyclic Database Schemes", In Proceedings of the Seventh International Conference on Very Large Data Bases—vol. 7, 1981, 13 pages.
Zhu et al. "Looking Ahead Makes Query Plans Robust: Making the Initial Case with in-Memory Star Schema Data Warehouse Workloads", Proc. VLDB Endow 10, 8 (Apr. 2017) 12 pages.

\* cited by examiner

PREDICATE TRANSFER PRE-FILTERING ON MULTI-JOIN QUERIES

FIELD OF THE DISCLOSURE

The present disclosure is related to computer systems, particularly to predicate transfer pre-filtering on multi-join queries in database systems.

BACKGROUND

Large scale database systems can be time and resource intensive to search, particularly where complex relationships exist between records in multiple tables. Query operations can be used to search databases for records that may be distributed across multiple tables. Tables can include many rows of records that can be related by key or index values distributed across tables. As table size and relationship complexity increases, the process of searching for records with related values distributed across tables can consume greater amounts of processing and memory resources, resulting in slower responsiveness of database systems.

BRIEF SUMMARY

In an aspect, a method includes receiving, by a predicate transfer system including at least one processor and a memory system, a query of a database including a plurality of tables. The method also includes constructing, by the predicate transfer system, a join graph including a plurality of vertices and edges, where each of the vertices corresponds to one of the tables to be accessed in response to the query and each of the edges corresponds to a join operation. The method additionally includes constructing, by the predicate transfer system, a local predicate including a filter. The method further includes transferring, by the predicate transfer system, the local predicate across the join graph such that two or more of the tables of the join graph have a local filter and one or more transferred filters. The local filter and one or more transferred filters can be applied to the tables of the join graph. Join operations can be performed on the filtered tables of the join graph and a result of the query returned based on joining the filtered tables.

According to an aspect, a system includes a memory system having a plurality of computer readable instructions and one or more processors configured to execute the computer readable instructions to perform a plurality of operations. The operations include receiving query of a database including a plurality of tables and constructing a join graph including a plurality of vertices and edges. Each of the vertices corresponds to one of the tables to be accessed in response to the query and each of the edges corresponds to a join operation. The operations also include constructing a local predicate including a filter, transferring the local predicate across the join graph such that two or more of the tables of the join graph have a local filter and one or more transferred filters, and applying the local filter and one or more transferred filters to the tables of the join graph. The operations can further include performing join operations on the filtered tables of the join graph and returning a result of the query based on joining the filtered tables.

According to a further aspect, a computer program product includes a computer readable storage medium embodied with computer program instructions that when executed by one or more processors cause the one or more processors to perform a plurality of operations including receiving a query of a database including a plurality of tables and constructing a join graph including a plurality of vertices and edges, where each of the vertices corresponds to one of the tables to be accessed in response to the query and each of the edges corresponds to a join operation. The operations can also include constructing a local predicate including a filter, transferring the local predicate across the join graph such that two or more of the tables of the join graph have a local filter and one or more transferred filters, applying the local filter and one or more transferred filters to the tables of the join graph, and performing join operations on the filtered tables of the join graph. The operations can further include returning a result of the query based on joining the filtered tables.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
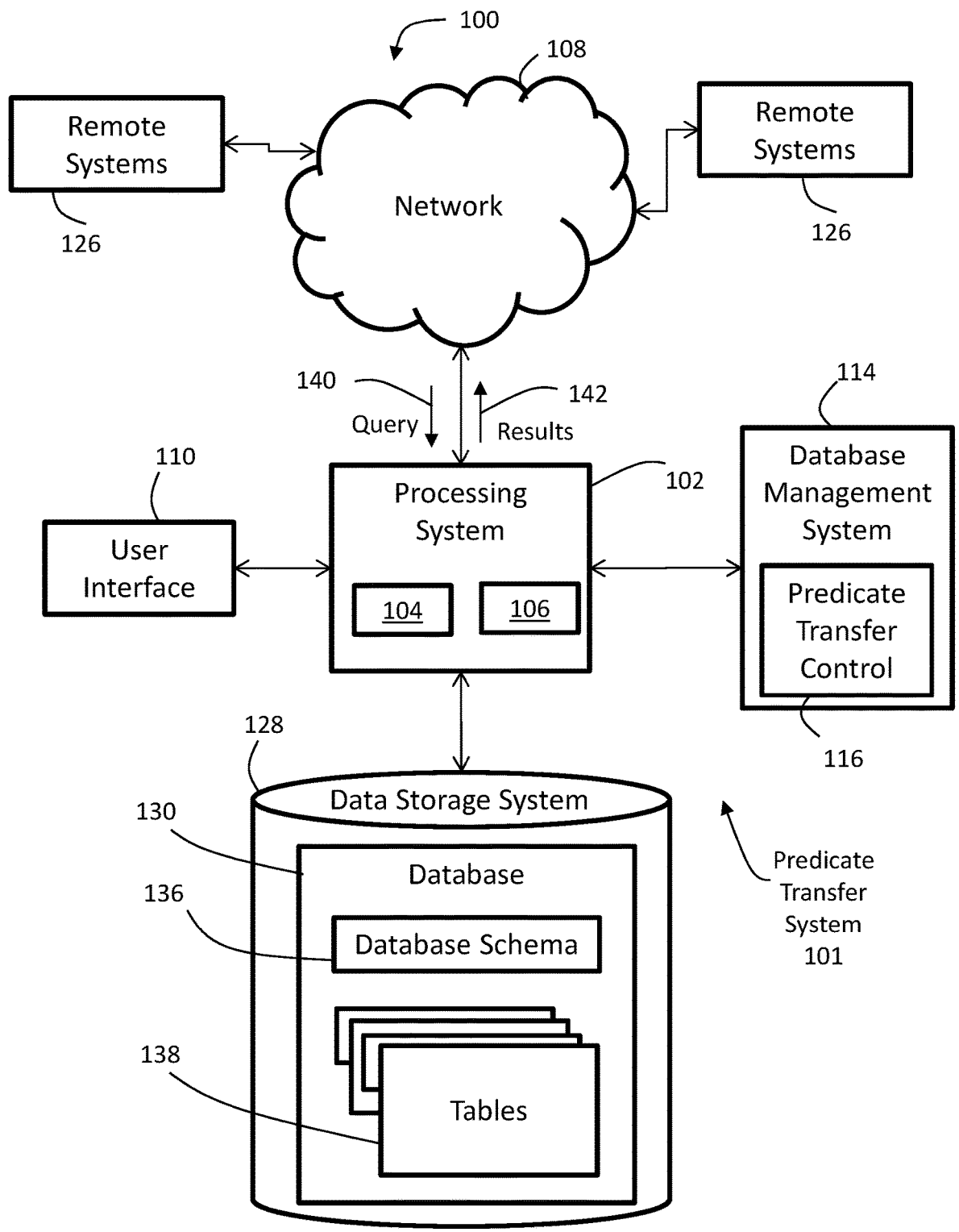
FIG. 1 depicts a system in accordance with one or more embodiments.

The diagrams depicted herein are illustrative. There can be many variations to the diagrams or the operations described therein without departing from the spirit of the invention. For instance, the actions can be performed in a differing order or actions can be added, deleted or modified. All of these variations are considered a part of the specification.

DETAILED DESCRIPTION

Described herein are methods, systems, and computer program products for predicate transfer that include pre-filtering on multi-join queries in database systems. In an aspect, join performance can be improved by pre-filtering tables to reduce join input sizes. In performing queries, join operations can combine data from multiple tables.

Joins constitute a substantial portion of query execution time in database systems. One effective approach for enhancing join performance is to reduce join input sizes by pre-filtering rows that will not appear in the join result. Predicate pushdown exemplifies this principle by applying local predicates on a table before executing a join operation. A Bloom join extends this principle beyond a single table. In a Bloom join, a Bloom filter is constructed using a join key in one table, and the join key is sent to another table to filter out rows that do not pass the filter. The filtered out rows do not match any keys in the first table and will not participate in the join. A Bloom join can effectively reduce the join input sizes, thereby reducing the query runtime. However, Bloom join solutions typically can perform such pre-filtering only within a single join operation. According to an aspect, the pre-filtering principle can be extended across multiple joins. Using predicates on individual tables to pre-filter multiple other tables in a query can further reduce the join input sizes. This is referred to as a predicate transfer. As one example, a predicate on one table T1 can be transferred (e.g., in the form of a Bloom filter) to a table T2 that joins with T1. T2 can apply the predicate and further transfer it to a table T3 that joins with T2 (but T1 does not necessarily join with T3). The transfer process can propagate further such that the original predicate can filter multiple other tables (e.g., T2, T3, etc.). A Bloom join is a special case of a more generalized predicate transfer. A Bloom join can be a one-hop predicate transfer.

Rather than semi-joining the tables following the tree structure of a query until every predicate is spread across all joining tables, embodiments can avoid potentially costly hash table probes and memory consumption in a semi-join phase. Predicate transfer can address practical limitations of conventional approaches. Predicate transfer can significantly reduce the overhead of semi-joins by passing succinct data structures, such as Bloom filters.

A Bloom filter is a compact probabilistic data structure that determines whether an element exists in a set. A Bloom filter has no false negative but may have false positives. In a Bloom join of two tables, a Bloom filter is constructed on one table (typically the smaller one) using a join key. The filter is then sent and applied to each row in the other table. If a row does not pass the filter, it matches no row in the first table and should not participate in the join. Since testing a Bloom filter is generally faster than performing a join, performing a Bloom join can speedup query processing, especially when the join is selective.

Contemporary Bloom join algorithms typically can be applied to only a single join operation. This means that the predicate on one table can only be used to pre-filter rows in the other table it joins with; namely, the predicate is transferred in one-hop and one-direction.

Another approach can prefilter out all rows from tables that do not appear in the final join result, thereby achieving the theoretically maximum filtering selectivity. This approach can be applied to acyclic join queries. The acyclicity is more formally termed as α-acyclicity. This approach can be proven to run in O(N+OUT) time, where N is the size of input relations and OUT is the query output size. Thus, this approach can be instance optimal since N+OUT is an unavoidable time cost of reading input and enumerating output for a query. This approach can start by choosing a rooted join tree arbitrarily, and then proceeds with a semi-join phase and a join phase.

A semi-join phase can contain two passes: a forward pass and a backward pass. The forward pass traverses a join tree in a bottom-up fashion. At each vertex, a table can be filtered by a sequence of semi-joins with its children. A semi-join of two tables R and S can be defined as $R \ltimes S = \Pi_{attr(R)}(R \bowtie S)$, which effectively removes all tuples in R that do not join with any tuple in S. The forward pass stops when the root node is reached. Similarly, the backward pass traverses the join tree in a top-down fashion. At each vertex, the table is filtered by a semi-join with its parent. The backward pass stops when all leaf nodes are reached. It can be shown that both passes can be executed in O(N) time and tuples that will not contribute to the output are removed.

A join phase can join filtered tables in any order. It can be shown that regardless of the chosen join order, the join phase can be executed in O(OUT) time. The semi-join phase filters redundant tuples, and the join phase executes the join with automatic robustness. Thus, tables can be joined in any order without any intermediate table size blow-up over the output size.

Turning now to FIG. 1, a system 100 is depicted according to an aspect of the disclosure. The system 100 of FIG. 1 can include processing system 102 including a memory system 106 having a plurality of computer readable instructions stored therein and one or more processors 104 operable to execute software instructions embodied in one or more applications, such as a database management system 114 with a predicate transfer control 116. The processing system 102 may be a single computer system such as a workstation, a personal computer, a laptop computer, a tablet computer, a mobile device, or the like. Alternatively, the processing system 102 can be distributed between multiple computing devices such as a mainframe, a cloud-based computing system, or other type of processing resources including one or more networked devices. The processing system 102 can interface with multiple systems and data sources through a network 108.

The network 108 can include any type of computer communication technology within the system 100 and can extend beyond the system 100 as depicted. Examples include a wide area network (WAN), a local area network (LAN), a global network (e.g., Internet), a virtual private network (VPN), and an intranet. Communication within the network 108 may be implemented using a wired network, an optical network, a wireless network and/or any kind of physical network implementation known in the art. The network 108 can be further subdivided into multiple subnetworks that may provide different levels of accessibility or prevent access to some elements of the system 100. For example, some systems, devices, applications, or users may have limited access to a data storage system 128 and/or other elements of the system 100.

A user interface 110 can be provided to interact with the processing system 102, such as one or more of a keyboard, a mouse or pointer device, a camera, speakers, a microphone, a video display, and/or a touch-sensitive display. The database management system 114 can be accessed through the user interface 110 and/or accessed by one or more remote systems 126 through the network 108. The remote systems 126 can be various types of computing devices, such as mobile devices, tablet computers, laptop computers, personal computers, workstations, internet connected devices, and/or other such devices capable of executing applications and/or interfacing to a website. Remote systems 126 can have various permissions with respect to the system 100, such as administrative privileges, private user privileges, and/or public user privileges. For instance, an administrative user may be able to updates aspects of the database management system 114, predicate transfer control 116, and/or a database 130 stored in the data storage system 128. A private user may have access to query the database 130 with a wider set of access permissions than a public user. For example, a user at one of the remote systems 126 can send a query 140 to the database management system 114, which can use the predicate transfer control 116 to perform pre-filtering on multiple join operations associated with the query 140 to select relevant rows of tables 138 and return results 142 back to the user at the corresponding remote system 126.

The data storage system 128 can be used to store the database 130, files, and/or other data. The database 130 can be a relational database with a database schema 136 that defines relationships between a plurality of tables 134, which may vary in size having different numbers of rows and columns per table 134. The database schema 136 can define which aspects of the tables 134 are used as index or key values in relation to other tables 134. In some aspects, index or key values can be inherent, such as a row number. The combination of the processing system 102, database management system 114 with predicate transfer control 116, and the data storage system 128 may be collectively referred to as a predicate transfer system 101.

Figure 2:
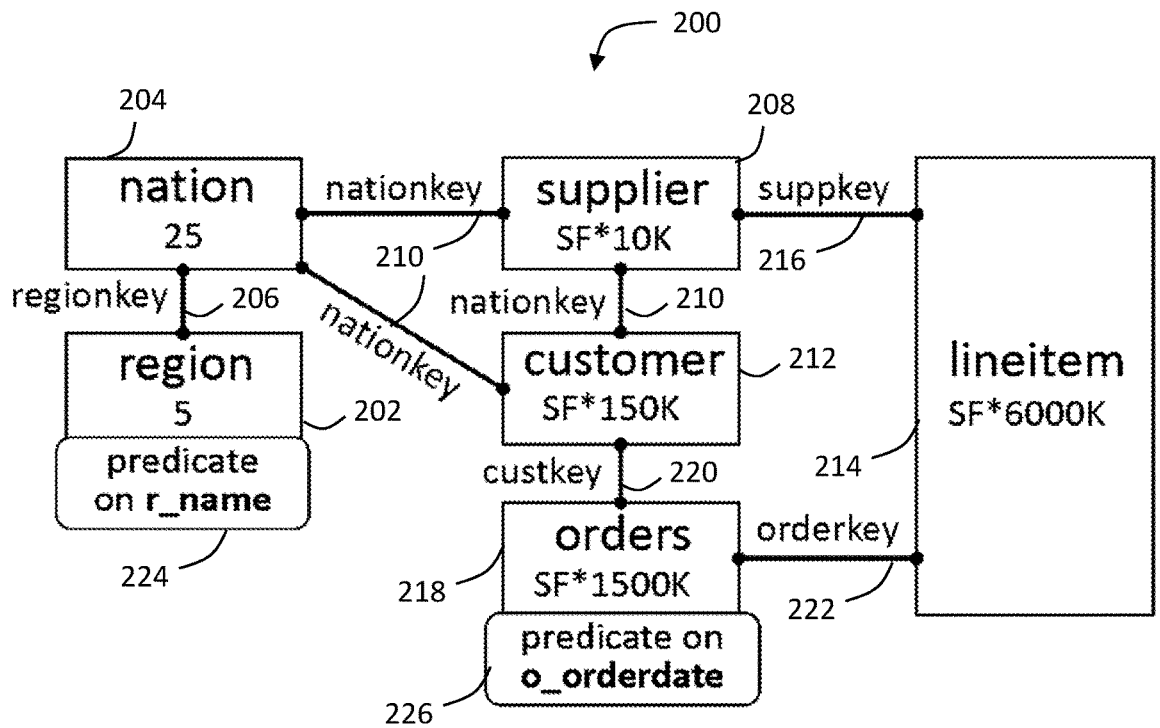
FIG. 2 depicts a join graph example in accordance with one or more embodiments.

FIG. 2 depicts an example of a join graph 200 in accordance with one or more embodiments. The join graph 200 can include a plurality of vertices and edges, where each of the vertices corresponds to one of the tables to be accessed in response to a query and each of the edges corresponds to a join operation. In this example, the query 140 of FIG. 1 is associated with six tables, six inner joins, and two predicates on a region table 202 and orders table 218 respectively. The example assumes an equi-join between tables. The query 140 of FIG. 1 may seek information regarding a region name and an order date for data within the database 130 of FIG. 1. The tables 138 of FIG. 1 can have a joining relationship, where a region table 202 is related to a nation table 204 by a region key 206. The nation table 204 is related to a supplier table 208 by a nation key 210 and to a customer table 212. The supplier table 208 and the customer table 212 can be related to each other by the nation key 210. The supplier table 208 can be related to a line item table 214 by a supplier key 216. The customer table 212 can be related to an orders table 218 by a customer key 220. The orders table 218 can also be related to the line item table 214 by an order key 222. In the example join graph 200 of FIG. 2, a first predicate 224 can be a filter on region name applied to the region table 202, and a second predicate 226 can be a filter on order date applied to the orders table 218. The example of FIG. 2 also illustrates how the join graph 200 can have cyclic relationships which may not be handled by other approaches that require acyclic relationships.

Figure 3:
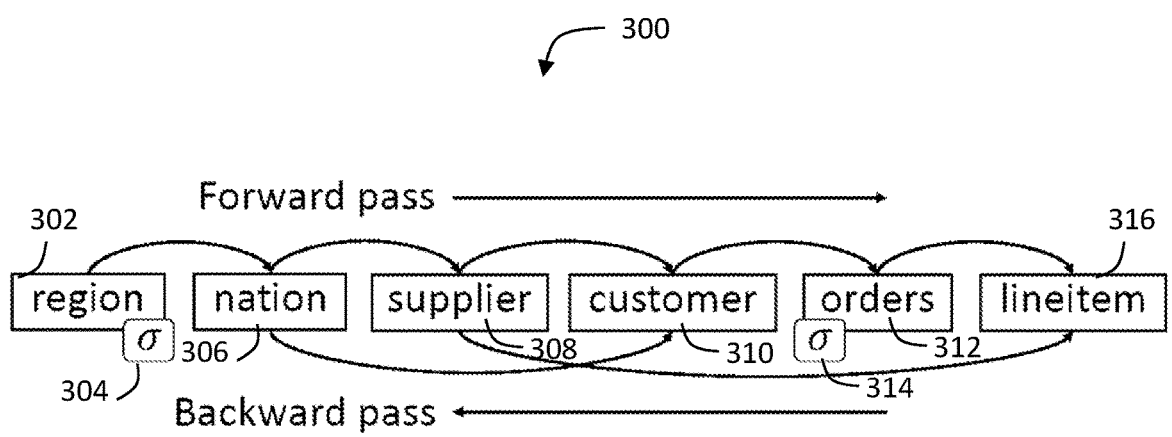
FIG. 3 depicts a predicate transfer graph example in accordance with one or more embodiments.

FIG. 3 depicts a predicate transfer graph 300 in accordance with one or more embodiments. The predicate transfer graph 300 illustrates the first predicate 224 of the region table 202 of FIG. 2 (e.g., region node 302 and predicate 304) and the second predicate 226 of orders table 218 (e.g., orders node 312 and predicate 314) can be passed with pre-filtering between other nodes 306, 308, 310, 316 in a semi-join phase. For example, a forward pass from region node 302 can proceed as a sequence of semi-joins to nation node 306, supplier node 308, customer node 310, orders node 312, and line item node 316. Forward passes can also be made between nation node 306 and customer node 310 and between supplier node 308 and line item node 316. Backward passes can then be performed in the opposite direction.

As one example, the predicate transfer control 116 of FIG. 1 can execute the query 140 in two phases. The first phase is a predicate transfer phase. The predicate transfer control 116 can construct the join graph 200 for the query 140, where each vertex is a table and each edge is a join operation. A local predicate can be constructed as a filter (e.g., a Bloom filter) and be transferred across the join graph 200. The schedule of the predicate transfer phase introduces a large design space.

In the second phase, after the transfer phase finishes, each table can have multiple filters, including both local filters and transferred filters. The database management system 114 of FIG. 1 can apply the filters and perform regular joins. The actual inputs of each join can be substantially smaller if the transferred filters are selective.

Figure 4:
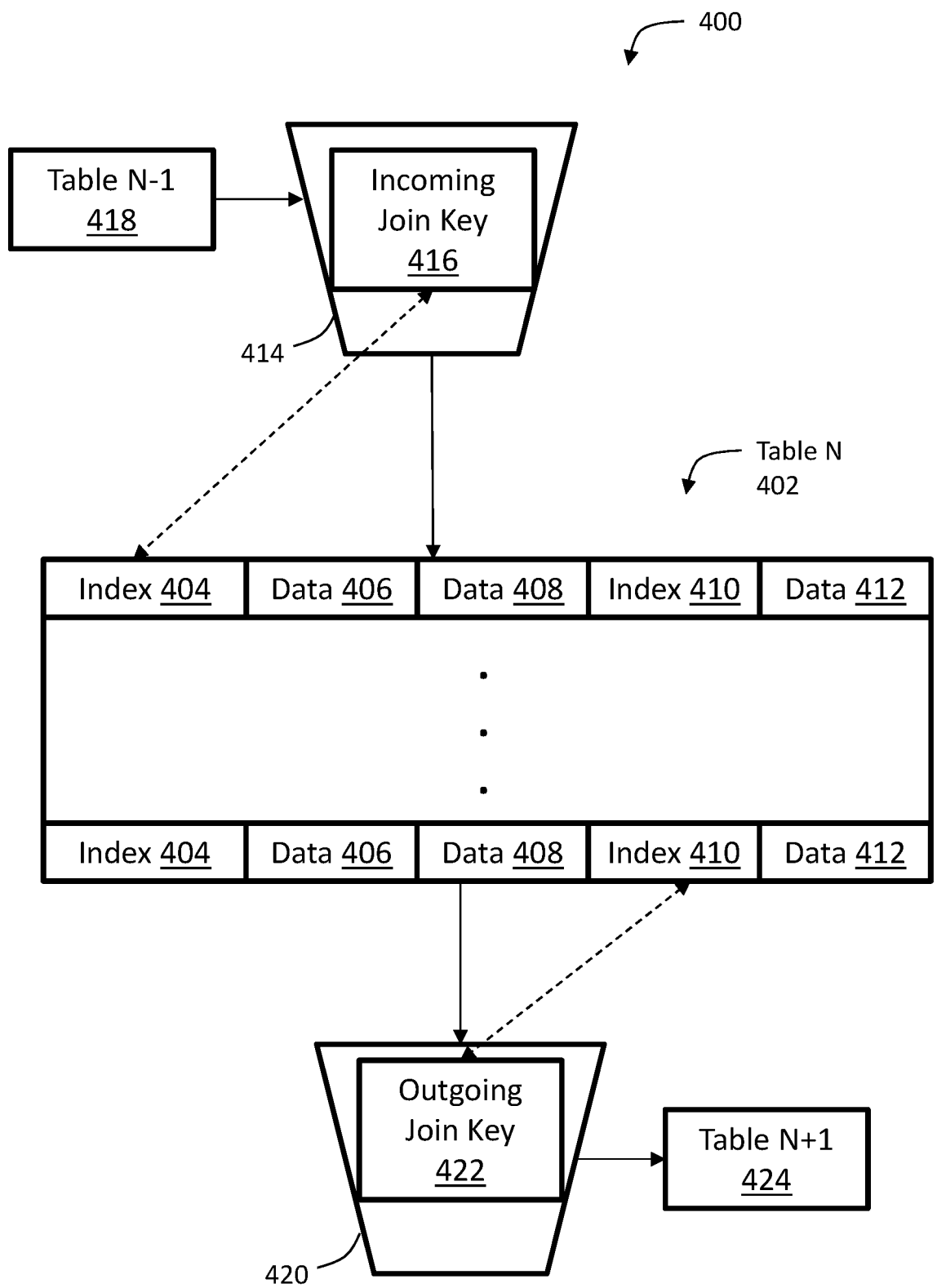
FIG. 4 depicts filter creation and processing to support predicate transfer in accordance with one or more embodiments.

When transferring a filter across edges that have different join keys, the filter may be transformed. For example, a filter constructed on the region table 202 can be transferred to the nation table 204, but the same filter cannot be directly sent to the supplier table 208 since the join keys do not match. This is illustrated in FIG. 4, where filter creation and processing to support predicate transfer are depicted in block diagram 400. A table N 402 can include a plurality of rows, with a first index column 404, data value columns 406, 408, a second index column 410, and additional data value columns 412, for example. An incoming filter 414 can include an incoming join key 416 received from an upstream table N−1 418, where the incoming join key 416 aligns with the first index column 404. An outgoing filter 420 can be created by the predicate transfer control 116 with an outgoing join key 422 based on the second index column 410 that aligns with a downstream table N+1 424. Although referred to herein as index columns, the first index column 404 and the second index column 410 need not hold index values; rather, the first index column 404 and the second index column 410 can be any type of data columns that support join operations and thus may also be referred to as join columns.

With respect to the example of FIG. 2, a join key mismatch between incoming and outgoing edges on the nation table 204 can be seen where region key 206 differs from nation key 210. When an incoming filter is received, an empty outgoing filter can be created. Columns for both incoming and outgoing join keys in the nation table 204 can be scanned (e.g., assuming columnar store; otherwise, scan the entire table). Inherent filters of nation table 204 can be applied during the scan. For each row, the incoming join key can be used to probe the incoming filter. If a match occurs, the outgoing join key can be added to the outgoing filter. At the end of the scan, the outgoing filter can be sent to downstream tables (i.e., supplier table 208 and customer table 212). These operations can be performed efficiently, the join keys may only be scanned once. The join graph 200 determines the topology of the predicate transfer graph 300. In the example of FIG. 2, each equi-join is represented as an edge. The predicate transfer graph 300 can be a directed subgraph of the join graph 200. Transfers can happen along selected edges in the subgraph-local predicates of the source vertex are transferred to the target vertex as a filter. The topology of the predicate transfer graph 300 affects the performance of the predicate transfer phase and also the selectivity of the transferred filters. One heuristic that can be used points an edge from a smaller table to a bigger table. This can reduce Bloom filter size and increase filter selectivity. Other heuristics can remove one or more edges from the join graph 200 when generating the predicate transfer graph 300. The resulting graph can be a Directed Acyclic Graph (DAG).

A transfer schedule can determine when and how predicates are transferred across the predicate transfer graph 300. Numerous design decisions can be made in the transfer schedule. In particular, the transfer schedule can specify which tables 138 in the query 140 should construct initial local filters to start the transfer process and the order of issuing the remaining transfers. For each table that sends a local filter out, the schedule determines when the transfer happens-multiple transfers may happen in serial or parallel. Moreover, the transfer can happen back and forth, following both directions of certain edges. Pruning may be adopted to avoid non-beneficial transfers, and the transfer direction may be dynamically adjusted at runtime. Identifying an efficient transfer schedule can improve system performance.

A heuristic that builds the transfer schedule using one forward pass and one backward pass can be implemented by the predicate transfer control 116. The predicate transfer graph 300 can be determined at planning time and remain fixed during runtime. In the forward pass, initial local filters can be built on the leaf nodes in the predicate transfer graph (i.e., nodes with only outgoing edges but no incoming edge). These filters can be transferred following the topological order of the predicate transfer graph 300, which exist because the graph is a DAG. If one node has one or more incoming edges, the node can collect all the incoming filters before performing the transformation to produce outgoing filters (incoming filter ordering can be utilized for further optimization). The transformation can scan a table only once, regardless of the number of incoming or outgoing edges. The forward pass finishes once all filters are fully transferred. The predicate transfer control 116 can then start the backward pass, where the direction of edges are traversed in reverse and the same process can be repeated as in the forward pass. After both passes are done, each table has been reduced based on the transformed filters it received. A later join phase can start from the pre-filtered tables. For example, a first Bloom filter can be constructed for region node 302 and sent to the nation node 306 of FIG. 3. The filter can be transformed into two outgoing filters and sent to the customer node 310 and the supplier node 308 respectively. Similarly, the supplier node 308 can transfer two outgoing filters following the edges to the customer node 310 and the line item node 316. At the customer node 310, two separate incoming filters can be applied with one outgoing filter produced and sent to the orders node 312, which is then transformed and sent to the line item node 316. The forward pass finishes when both incoming filters arrive at the line item node 316, and after that the backward pass can begin in a symmetric way.

In some aspects, other representation of filters can also be used other than Bloom filters. If a precise representation is used, i.e., the filter precisely encodes all the join keys, then a transfer becomes a semi-join. The filters should be efficient to construct and check, and achieve low false positive rates. Predicate transfer may benefit from other filtering techniques.

In some aspects, scheduling heuristics can make two full passes of the predicate transfer graph 300. Some transfers may not increase filter selectivity but consume computational resources. A transfer scheduler of the predicate transfer control 116 can identify such scenarios and stop transferring these filters further to avoid wasting processor cycles. Such transfer path pruning can be done at either planning time or runtime.

After the predicate transfer phase completes, each table may have already been processed by several filters, including the inherent filters from the query 140 and the transferred filters. The join phase can execute the original query with the reduced input tables. In some aspects, the database management system 114 can directly execute a query plan as a regular query in the join phase, with the leaf nodes (i.e., scan) replaced by the filtered tables produced by the predicate transfer phase. A predicate transfer schedule is essentially also a query plan. The two query plans can be concatenated such that the leaf nodes in the join plan are the output nodes of the predicate transfer schedule. This can avoid rescanning in the join phase and requires no changes to the executor—the executor can be oblivious to the predicate transfer phase and execute the modified query plan regularly.

The predicate transfer phase can update the cardinality of the input tables in the join phase. Therefore, the original query plan generated beforehand may become suboptimal based on the stale cardinalities. A replanning step between the two phases may produce a better plan that leads to further performance improvement. Although join performance may be more robust to join orders, performance can still be affected by the quality of the query plan, with the factors including the size of materialized intermediate tables, which table to build the hash table and which table to probe, etc. Moreover, predicate transfer can bound the size of the intermediate join tables in the join phase, which can be utilized to improve cardinality estimation.

In the previous example, table joins were performed as inner equi-joins and cover queries with only joins and local filters (filters over base tables). Predicate transfer can be extended to support outer joins as well. In particular, a left outer join operation can be incorporated into a predicate transfer graph by allowing predicate transfer in only one direction, i.e., from the left table to the right table, but the other transfer direction can be blocked. Therefore, such a transfer can happen in either forward pass or backward pass, but not in both passes. A right outer join can be supported in a similar way. A full outer join, however, may not be incorporated into the predicate transfer graph. Considering more general operators, it is noted that an operator can block predicate transfer if it does not preserve the join key during the computation (e.g., perform aggregations on the join key). In particular, the following operators that can also be incorporated into the predicate transfer graph, such as: operators including filters between intermediate join tables, column projection, sorting, and top-K do not block predicate transfer; grouped aggregation does not block predicate transfer when the join key is a subset of the group key; scalar user-defined functions does not block the transfer to the downstream join, but may block the transfer to the upstream join if the function is not invertible.

Some queries may contain operators that cannot be incorporated into a predicate transfer graph. Example operators can include but are not limited to full outer joins, scalar aggregations, and group-by aggregations where the join key is being aggregated. When such a scenario is encountered, predicate transfer can be applied on a subset or several subsets of the query execution plan, and conventional methods can be used to execute the remainder of the query. For example, a query can be partially executed first, leading to a subquery plan that can be represented as a predicate transfer graph in order to apply predicate transfer. After the predicate transfer phase and the join phase, the rest of the query can continue execution. It is also possible that predicate transfer can be applied multiple times to different parts of a query plan. For instance, a predicate transfer phase and regular query execution can alternate. In some aspects, heuristics can be applied by the predicate transfer control 116 to first identify and execute single-table subquery plans (e.g., group by aggregation on a single table) before the predicate transfer phase begins.

Predicate transfer can support both precise filters (e.g., semi-join) and Bloom filters, any join-graph topology, outer joins and cyclic queries, more operators, and complex predicate transfer schedules. Predicate transfer can be more efficient and robust than other approaches and may achieve close to optimal pre-filtering efficiency. Using Bloom filters can drastically reduce processing resource usage as compared to the use of excessive hash probes in the semi-join phase, filter out most tuples not participating in the join, and may only incur relatively small overhead in the join phase. For example, let t be the number of tables in a given join query and N be the input size (i.e., the total number of tuples in all joining tables). A unit cost can be assigned to each per-tuple scan, hash table insertion or probe, and a $\beta$ cost per-tuple for Bloom filter insertion or probe. As a Bloom filter is of a small size and thus likely to be cache resident, Bloom filter operations are typically much less resource intensive than hash table operations, i.e. $\beta \ll 1$. The Bloom filter can have a false positive rate of $\in \ll 1$ that can be appropriately configured (e.g., tune $\in$ to be smaller by increasing the Bloom filter size or number of hash functions, but this makes $\beta$ larger). At the semi-join phase, scanning tables to build or probe hash tables can cost N units, independent of the direction of the forward/backward semi-join passes. The cost of building or probing intermediate hash tables can be bounded by cy·N, where cy is a constant highly sensitive to the choice of the rooted join tree of the query. An ideal join tree and orientation can drastically reduce the size of intermediate hash tables, leading to a cheaper semi-join phase (smaller cy). At the predicate transfer phase, scanning tables to build or probe Bloom filters can cost N units. By building and probing with Bloom filters, the cost can be bounded by $\beta \cdot cp \cdot N$ units, where cp is a constant that depends on the choice of the join graph topology and transfer schedule. As $\beta \ll 1$, the sensitivity of the runtime to the constant cp can shrink by a factor of $\beta$. In the join phase, tables can be slightly larger than the maximum filtered tables after semi-joins phase of other approaches, by a factor of about $(1+\in)t \approx 1+\in t$. Thus, in the join phase, the cost of predicate transfer can be approximated ast·OUT·$(1+\in)$ units. The choice of the join order can affect the extra $\in t \cdot OUT$ term. Assuming $\in \ll 1$ (and so $\in t \cdot OUT$ is small), the join phase can attain near-perfect robustness. Other approaches can have a higher cost and may result in an unstable/less stable semi-join phase. In contrast, predicate transfer can address such shortcomings via a more stable and efficient Bloom filter transfer scheme, while maintaining near-maximum filtering capabilities at the predicate transfer phase and near-perfect robustness in the join phase.

Figure 5:
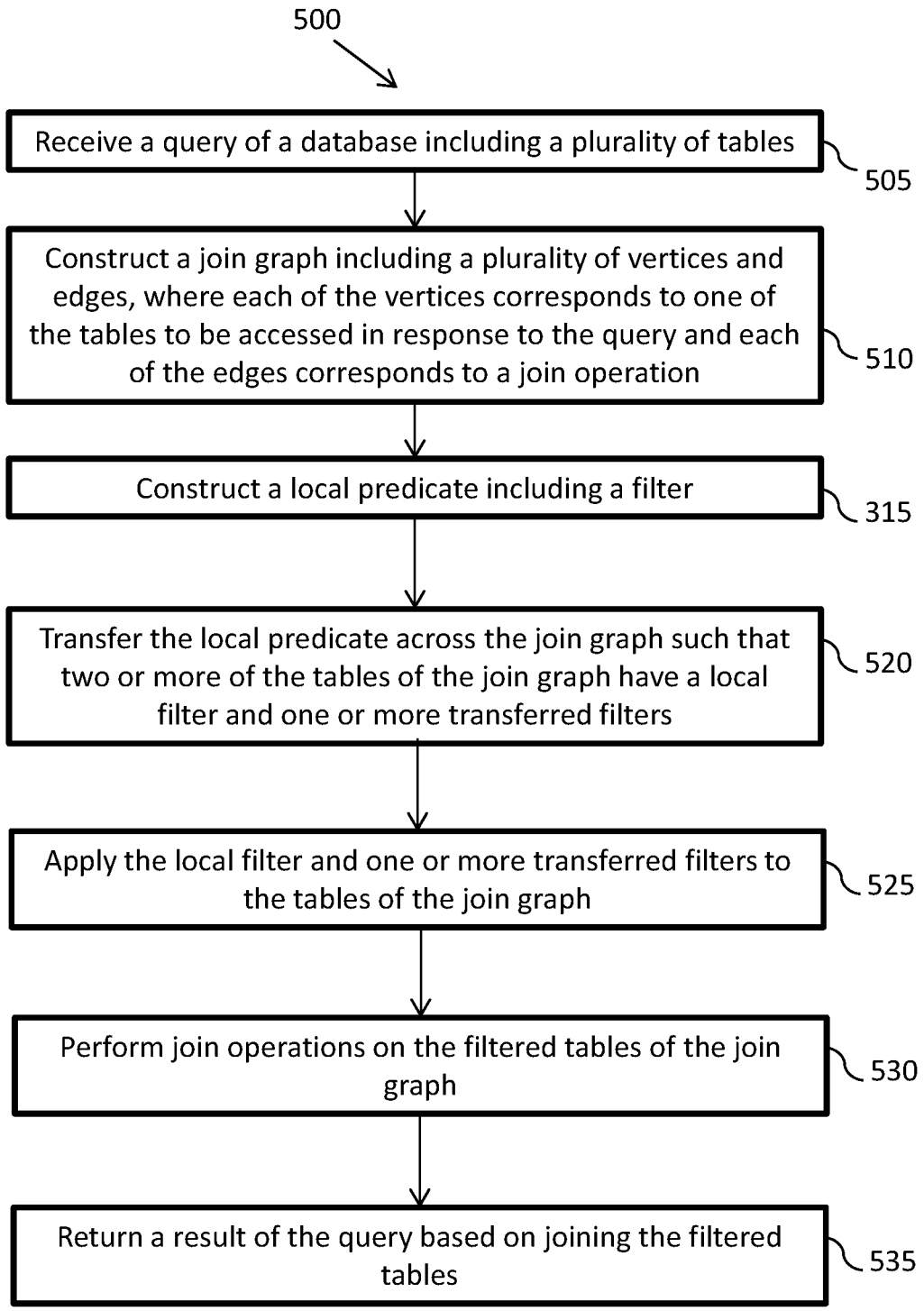
FIG. 5 depicts a predicate transfer process in accordance with one or more embodiments.

FIG. 5 depicts a predicate transfer process 500 in accordance with one or more embodiments. The predicate transfer process 500 can be performed by the database management system 114 with the predicate transfer control 116 of FIG. 1. The process 500 is described in reference to FIGS. 1-5.

At block 505, a predicate transfer system 101 including at least one processor 104 and a memory system 106, can receive a query 140 of a database 130 including a plurality of tables 138. The database 130 can be a relational database, for example.

At block 510, the predicate transfer system 101 can construct a join graph 200 including a plurality of vertices and edges, where each of the vertices corresponds to one of the tables (e.g., tables 202, 204, 208, 212, 214, 218) to be accessed in response to the query 140 and each of the edges corresponds to a join operation (e.g., through keys 206, 210, 216, 222).

At block 515, the predicate transfer system 101 can construct a local predicate including a filter, such as first predicate 224 and/or second predicate 226. The filter can use a join key in one of the tables to filter out one or more rows in one or more of the tables to prevent participation in join operations of the one or more rows that do not match the join key.

At block 520, the predicate transfer system 101 can transfer the local predicate across the join graph 200 such that two or more of the tables of the join graph 200 have a local filter and one or more transferred filters.

At block 525, the predicate transfer system 101 can apply the local filter and one or more transferred filters to the tables of the join graph 200.

At block 530, the predicate transfer system 101 can perform join operations on the filtered tables of the join graph 200.

At block 535, the predicate transfer system 101 can return a result 142 of the query 140 based on joining the filtered tables.

According to some aspects, the predicate transfer system 101 can construct a predicate transfer graph 300 to establish an order of transferring the local predicate across the tables of the join graph 200. As one example, the predicate transfer graph 300 can order the tables of the join graph 200 from smallest to largest (e.g., fewest number of rows to greatest number of rows). In some aspects, filtering can be performed in the order of transferring the local predicate across the tables of the join graph 200 in a forward pass to semi-join the tables in a bottom-up filtering by a backward pass to semi-join the tables in a top-down filtering to remove tuples that do not contribute to the result 142 of the query 140. The predicate transfer system 101 may also determine whether a filter transfer will increase filter selectivity and prevent a filter transfer based on determining that the filter transfer will not increase filter selectivity. In some aspects, the predicate transfer system 101 can concatenate one or more leaf nodes of a join plan associated with the join graph 200 with one or more output nodes of a predicate transfer schedule of the predicate transfer graph 300.

Query plans can be generated as a combination of multiple subquery plans. For example, the predicate transfer system 101 can generate a query plan that includes a plurality of subquery plans based on determining that the query 140 includes a full outer join or aggregation operation. The predicate transfer system 101 can construct the predicate transfer graph 300 to establish an order of transferring the local predicate across the tables of the join graph 200 based on one or more of the subquery plans.

Although depicted in a particular order, it will be understood that some steps of the process 500 can be performed in an alternate order, can be combined, further subdivided, and/or expanded upon.

Figure 6:
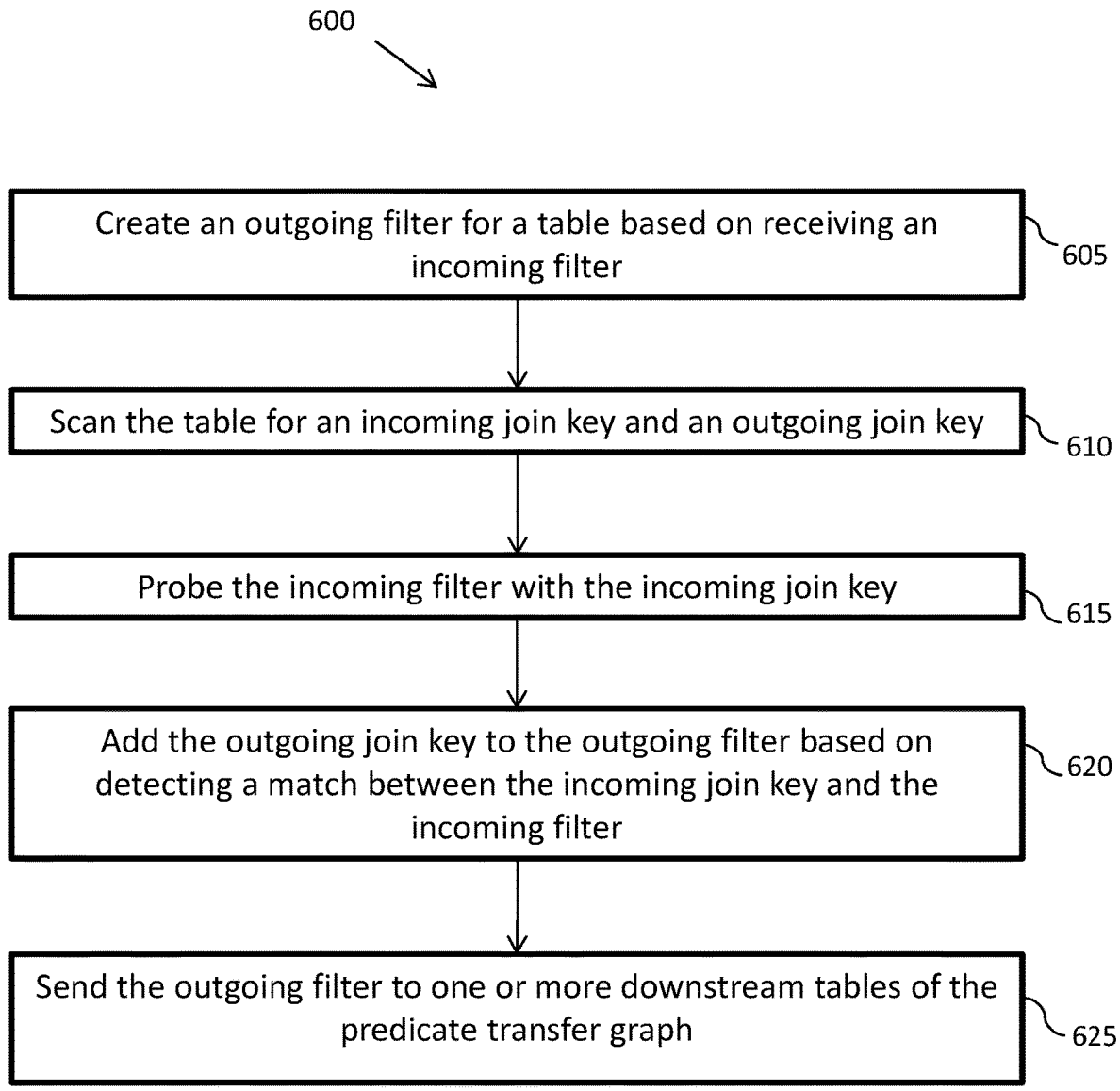
FIG. 6 depicts a filter transformation process in accordance with one or more embodiments.

FIG. 6 depicts a filter transformation process 600 in accordance with one or more embodiments. The process 600 can be performed by the predicate transfer system 101 of FIG. 1, for example. The process 600 can be performed in combination with the process 500 of FIG. 5.

At block 605, the predicate transfer system 101 can create an outgoing filter 420 for a table 402 based on receiving an incoming filter 414.

At block 610, the predicate transfer system 101 can scan the table 402 for an incoming join key 416 and an outgoing join key 422.

At block 615, the predicate transfer system 101 can analyze rows of the table 402 and probe the incoming filter 414 with the incoming join key 416.

At block 620, the predicate transfer system 101 can add the outgoing join key 422 to the outgoing filter 420 based on detecting a match between the incoming join key 416 and the incoming filter 414.

At block 625, the predicate transfer system 101 can send the outgoing filter 420 to one or more downstream tables (e.g., table 424) of the predicate transfer graph 300.

Although depicted in a particular order, it will be understood that some steps of the process 600 can be performed in an alternate order, can be combined, further subdivided, and/or expanded upon.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a non-transitory computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), phase change memory, an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the present invention may be written in any combination of one or more programming languages, including an object oriented programming language such as Java, Python, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a computer or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the present application. Numerical values, ranges, index selection, calibration, validation, and other parameters and/or processes described herein are provided for purposes of explanation, and the invention is not limited to using these examples.

In general, the invention may alternately comprise, consist of, or consist essentially of, any appropriate components herein disclosed. The invention may additionally, or alternatively, be formulated so as to be devoid, or substantially free, of any components, materials, ingredients, adjuvants or species used in the prior art compositions or that are otherwise not necessary to the achievement of the function and/or objectives of the present invention.

The terms "first," "second," and the like, herein do not denote any order, quantity, or importance, but rather are used to denote one element from another. The use of the terms "a" and "an" and "the" and similar referents (especially in the context of the following claims) are to be construed to cover both the singular and the plural, unless otherwise indicated herein or clearly contradicted by context. The terms first, second etc. as used herein are not meant to denote any particular ordering, but simply for convenience to denote a plurality of, for example, layers. The terms "comprising", "having", "including", and "containing" are to be construed as open-ended terms (i.e., meaning "including, but not limited to") unless otherwise noted. "About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±10% or 5% of the stated value. Recitation of ranges of values are merely intended to serve as a shorthand method of referring individually to each separate value falling within the range, unless otherwise indicated herein, and each separate value is incorporated into the specification as if it were individually recited herein. The endpoints of all ranges are included within the range and independently combinable. All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Any combination of the above-described elements in all possible variations thereof is encompassed by the invention unless otherwise indicated herein or otherwise clearly contradicted by context.

What is claimed is:

1. A method, comprising:
    receiving, by a predicate transfer system comprising at least one processor and a memory system, a query of a database comprising a plurality of tables;
    constructing, by the predicate transfer system, a join graph comprising a plurality of vertices and edges, wherein each of the vertices corresponds to one of the tables to be accessed in response to the query and each of the edges corresponds to a join operation;
    constructing, by the predicate transfer system, a local predicate comprising a local filter;
    transferring, by the predicate transfer system, the local predicate across the join graph such that two or more of the tables of the join graph have the local filter and one or more transferred filters;
    applying the local filter and one or more transferred filters to the tables of the join graph;
    performing join operations on the filtered tables of the join graph; and
    returning a result of the query based on joining the filtered tables.

2. The method of claim 1, wherein the database is a relational database.

3. The method of claim 1, wherein the local filter comprises using a join key in one of the tables to filter out one or more rows in one or more of the tables to prevent participation in the join operations of the one or more rows that do not match the join key.

4. The method of claim 1, further comprising:
    constructing a predicate transfer graph to establish an order of transferring the local predicate across the tables of the join graph.

5. The method of claim 4, wherein the predicate transfer graph orders the tables of the join graph from smallest to largest.

6. The method of claim 4, further comprising:
    performing filtering in the order of transferring the local predicate across the tables of the join graph in a forward pass to semi-join the tables in a bottom-up filtering by a backward pass to semi-join the tables in a top-down filtering to remove tuples that do not contribute to the result of the query.

7. The method of claim 6, further comprising:
    determining whether a filter transfer will increase filter selectivity; and
    preventing a filter transfer based on determining that the filter transfer will not increase filter selectivity.

8. The method of claim 4, further comprising:
    creating an outgoing filter for a table based on receiving an incoming filter;
    scanning the table for an incoming join key and an outgoing join key;
    probing the incoming filter with the incoming join key;
    adding the outgoing join key to the outgoing filter based on detecting a match between the incoming join key and the incoming filter; and
    sending the outgoing filter to one or more downstream tables of the predicate transfer graph.

9. The method of claim 4, further comprising:
    concatenating one or more leaf nodes of a join plan associated with the join graph with one or more output nodes of a predicate transfer schedule of the predicate transfer graph.

10. The method of claim 1, further comprising:
    generating a query plan that includes a plurality of subquery plans based on determining that the query includes a full outer join or aggregation operation; and
    constructing a predicate transfer graph to establish an order of transferring the local predicate across the tables of the join graph based on one or more of the subquery plans.

11. A system comprising:
    a memory system having a plurality of computer readable instructions; and
    one or more processors configured to execute the computer readable instructions to perform a plurality of operations comprising:

receiving query of a database comprising a plurality of tables;

constructing a join graph comprising a plurality of vertices and edges, wherein each of the vertices corresponds to one of the tables to be accessed in response to the query and each of the edges corresponds to a join operation;

constructing a local predicate comprising a local filter;

transferring the local predicate across the join graph such that two or more of the tables of the join graph have the local filter and one or more transferred filters;

applying the local filter and one or more transferred filters to the tables of the join graph;

performing join operations on the filtered tables of the join graph; and returning a result of the query based on joining the filtered tables.

12. The system of claim 11, wherein the database is a relational database.

13. The system of claim 11, wherein the local filter comprises using a join key in one of the tables to filter out one or more rows in one or more of the tables to prevent participation in the join operations of the one or more rows that do not match the join key.

14. The system of claim 11, wherein the computer readable instructions are executable by the one or more processors to perform the operations further comprising:

constructing a predicate transfer graph to establish an order of transferring the local predicate across the tables of the join graph.

15. The system of claim 14, wherein the predicate transfer graph orders the tables of the join graph from smallest to largest.

16. The system of claim 14, wherein the computer readable instructions are executable by the one or more processors to perform the operations further comprising:

performing filtering in the order of transferring the local predicate across the tables of the join graph in a forward pass to semi-join the tables in a bottom-up filtering by a backward pass to semi-join the tables in a top-down filtering to remove tuples that do not contribute to the result of the query;

determining whether a filter transfer will increase filter selectivity; and preventing a filter transfer based on determining that the filter transfer will not increase filter selectivity.

17. The system of claim 14, wherein the computer readable instructions are executable by the one or more processors to perform the operations further comprising:

creating an outgoing filter for a table based on receiving an incoming filter;

scanning the table for an incoming join key and an outgoing join key;

probing the incoming filter with the incoming join key;

adding the outgoing join key to the outgoing filter based on detecting a match between the incoming join key and the incoming filter; and sending the outgoing filter to one or more downstream tables of the predicate transfer graph.

18. A computer program product comprising a non-transitory computer readable storage medium embodied with computer program instructions that when executed by one or more processors cause the one or more processors to perform a plurality of operations comprising:

receiving a query of a database comprising a plurality of tables;

constructing a join graph comprising a plurality of vertices and edges, wherein each of the vertices corresponds to one of the tables to be accessed in response to the query and each of the edges corresponds to a join operation;

constructing a local predicate comprising a local filter;

transferring the local predicate across the join graph such that two or more of the tables of the join graph have & the local filter and one or more transferred filters;

applying the local filter and one or more transferred filters to the tables of the join graph;

performing join operations on the filtered tables of the join graph; and returning a result of the query based on joining the filtered tables.

19. The computer program product of claim 18, further comprising computer program instructions that when executed by the one or more processors cause the one or more processors to perform the operations further comprising:

constructing a predicate transfer graph to establish an order of transferring the local predicate across the tables of the join graph, wherein the local filter comprises using a join key in one of the tables to filter out one or more rows in one or more of the tables to prevent participation in the join operations of the one or more rows that do not match the join key.

20. The computer program product of claim 18, further comprising computer program instructions that when executed by the one or more processors cause the one or more processors to perform the operations further comprising:

constructing a predicate transfer graph to establish an order of transferring the local predicate across the tables of the join graph;

creating an outgoing filter for a table based on receiving an incoming filter;

scanning the table for an incoming join key and an outgoing join key;

probing the incoming filter with the incoming join key;

adding the outgoing join key to the outgoing filter based on detecting a match between the incoming join key and the incoming filter; and sending the outgoing filter to one or more downstream tables of the predicate transfer graph.

\* \* \* \* \*